United States Patent
Jacobs et al.

[15] 3,691,478
[45] Sept. 12, 1972

[54] LASER ENERGY MONITOR AND CONTROL

[72] Inventors: Harold Jacobs, West Long Branch; Albert J. Kerecman, Asbury Park; James D. Schumacher, Eatontown, all of N.J.

[73] Assignee: The United States of America as represented by the Secretary of the Army

[22] Filed: Nov. 9, 1970

[21] Appl. No.: 88,245

[63] Continuation of Ser. No. 740, 140, June 26, 1968, abandoned.

[52] U.S. Cl............331/94.5, 250/199, 329/DIG. 1, 313/210, 333/13, 250/83.3 H, 313/217
[51] Int. Cl...............................................H01s 3/22
[58] Field of Search........331/94.5; 250/199; 333/13; 313/210, 217; 320/DIG. 1; 250/83.3 H

[56] References Cited

UNITED STATES PATENTS

| | | |
|---|---|---|
| 2,965,787 | 12/1960 | Alexander et al........333/13 X |
| 3,159,707 | 12/1964 | Bennett et al. ..........331/94.5 |
| 3,246,158 | 4/1966 | Bell .........................250/199 |

OTHER PUBLICATIONS

Sobolev et al., "$CO_2$ Lasers," in Soviet Physics USPBKH1 Vol. 91, p. 425– 54 ( March 1967) Engl. Transl. Vol. 10. No. 12. Sept.–Oct. 1967– pp. 153–170

Primary Examiner—Ronald L. Wibert
Assistant Examiner—R. J. Webster
Attorney—Harry M. Saragovitz, Edward J. Kelly, Herbert Berl and Daniel D. Sharp

[57] ABSTRACT

An energy monitor for lasers which includes a chamber filled with a gas and containing electrodes to which an adjustable source of voltage is applied to establish a glow discharge. The gas-filled chamber can be integral with the laser or can be separate from the laser. In either case, the laser beam passes between the electrodes without impinging upon the electrodes. The laser beam passes through the monitor with no energy loss and, in some cases, with energy gain. The current flowing in the gas discharge of the monitor is a function of the laser energy and this current, or the voltage resulting from this current, may be measured by a suitable measuring device, such as a calibrated meter or cathode ray oscilloscope.

The aforesaid voltage may be used as a control voltage and fed back to control means associated with the laser to adjust the energy output.

The invention described herein may be manufactured, used, and licensed by or for the Government for governmental purposes without the payment to us of any royalty thereon.

6 Claims, 1 Drawing Figure

PATENTED SEP 12 1972
3,691,478
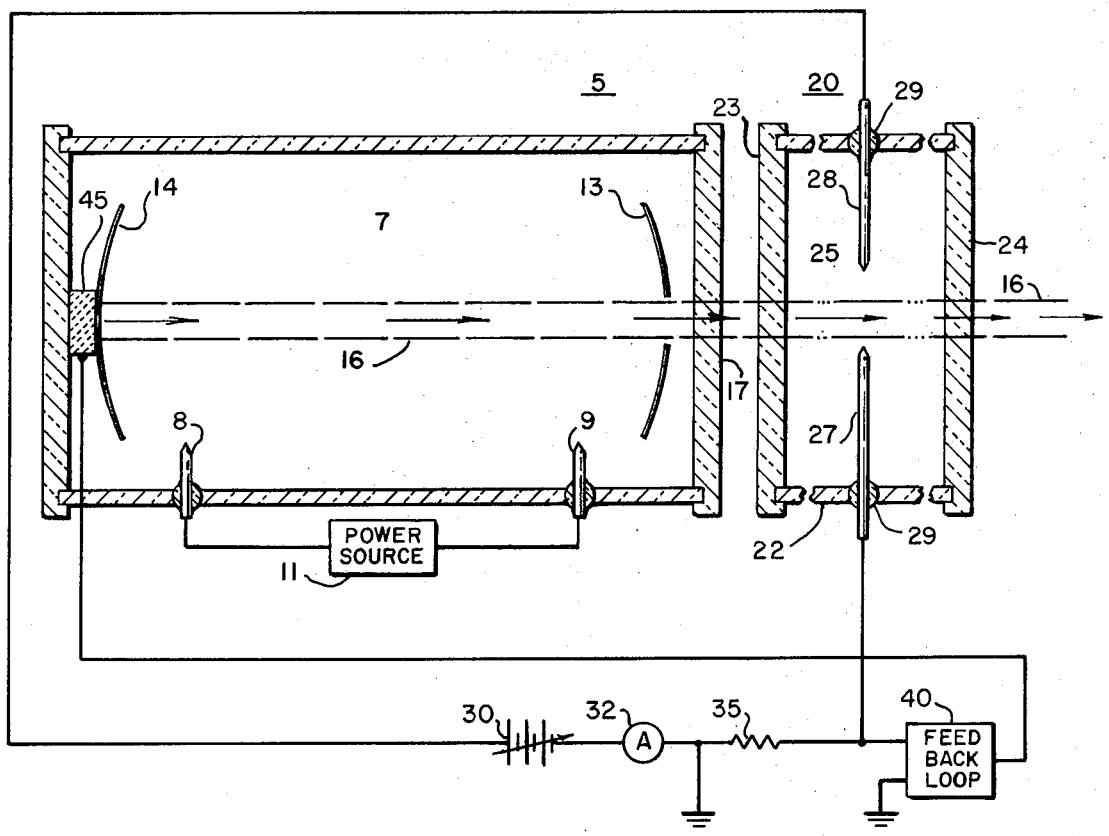
INVENTORS,
HAROLD JACOBS
ALBERT J. KERECMAN
JAMES D. SCHUMACHER.
BY: Harry M. Saragovitz,
Edward J. Kelly,
Herbert Berl &
Daniel D. Sharp   ATTORNEYS

LASER ENERGY MONITOR AND CONTROL

This application is a cont. of Ser. No. 740,140, 6/26/68, now abandoned.

BACKGROUND OF THE INVENTION

Prior art detectors such as photodetectors, thermistors, and thermocouples, either with or without beam splitters, cannot be used to detect or monitor the output of high energy lasers, such as some carbon dioxide gas lasers, which can reach continuous levels of 1 kilowatt and peak levels as high as 100 kilowatts. The prior art detectors would be rendered inoperable, if not completely destroyed, by exposure to such high energy laser beams. This may be true even when a beam splitting technique is used, since the portion of energy diverted by the beam splitter to the detector can be sufficient, at such high energy levels, to damage the detector. Moreover, when beam splitters are used, the ninety degree angular beam displacement introduced by the beam splitter, as well as the beam spread inherent in such devices, render the systems dangerous to equipment operators and other nearby personnel. Beam splitters also occupy considerable space because of the indirect beam path required prior to detection. In many cases, considerable energy loss is produced by the beam splitter, thus robbing the useful direct laser beam of much of its energy content.

When such prior art detectors are used, either alone or in conjunction with a beam splitter, in laser automatic control applications wherein a portion of the detected laser beam is fed back to control certain physical parameters of the laser, the aforementioned disadvantages also obviously arise, viz., (1) a portion of laser energy from the main laser beam is lost, further reducing the effective laser output, (2) the detector used to develop a control signal is subject to impairment or destruction when the laser energy applied thereto is large, (3) a beam splitter, if used, tends to defocus the laser beam, thus reducing its effective output, (4) more space is required for a beam splitter, if used, and (5) safety of personnel is decreased since the laser beam is spread or diverted along more than a single narrow path.

Gas tube microwave detectors are known which include electrodes having a potential connected thereacross for providing a discharge, sometimes with one or more additional electrodes for assisting the ionization process. One such detector is described in an article by P. J. W. Severin and A. G. vanNie entitled "A Simple and Rugged Wide-Band Gas Discharge Detector for Millimeter Waves," Page 431–436 of IEEE Transactions on Microwave Theories and Techniques, Volume MTT-14, Number 9 of September 1966. Essentially, this device is a low energy detector using a small neon tube with coaxial anode and cathode electrodes positioned within a microwave waveguide. In this detector the elongated cathode wire is part of the electron collection system and no attempt is made to separate the electrodes from the microwave energy. If such a detector tube were used to detect high energy laser beams at frequencies of the order of 10 microns, however, the electrodes in the tube would be melted and the glass or mica tube envelope would be destroyed because of the relatively large lattice absorption at such high frequencies in such organic materials as glass and mica.

Prior art detectors used with lasers of relatively low energy often require liquid helium or liquid nitrogen cooling when operating at ambient temperatures such as normally existing in a laboratory or in a military area. This cooling equipment adds appreciably to the bulk, weight and cost of the detecting equipment. Furthermore, the laser energy is disrupted and attenuated upon impinging on said detecting devices.

SUMMARY OF THE INVENTION

In accordance with the invention, a monitor is provided for laser beams, as well as an energy output control circuit for use with a laser. The laser beam monitoring device of the invention comprises a cylindrical chamber filled with a gas which preferably is characterized by a resonance absorption lying within the range of operation of the laser. The gas-filled chamber may be the gas-filled region of the laser itself, in which case, the monitor is integral with the laser, instead of externally of the laser, and the monitor electrodes are mounted within the laser independent of the laser excitation means. A unidirectional potential is applied to a pair of juxtaposed electrodes sealed into sides of the chamber and adjusted to a value suitable for operation in the glow discharge region. In circuit with the potential source and external to the chamber is a current limiting resistor and an indicating device, such as a current meter. The chamber is closed off by windows such as sodium chloride or potassium chloride, which, in addition to being transparent to the laser beam, are not destroyed or impaired by absorption of high level energy radiation in the infrared and optical region. The monitor device of the invention can be placed directly in the path of the laser beam and does not change appreciably the optics of the laser system.

The laser beam passes through the gas in the monitor chamber in a region between the aforesaid electrodes. The electrodes may be mounted either transverse or axial to the laser beam. The cathode glow region is influenced by the laser beam in such a manner as to cause a change in current flowing through the monitor and external circuitry, including an indicating device which may be calibrated in terms of laser energy.

The voltage appearing across the external resistor may be fed back to an electromechanical device associated with one of the laser resonator mirrors. For example, this control voltage can be applied to a piezoelectric or ceramic transducer element which undergoes mechanical movement dependent on the magnitude of the control voltage. As the aforesaid transducer element undergoes mechanical stress with application of the control voltage, the movable mirror laser resonator mirror attached thereto moves relative to the fixed resonator mirror until an optimum energy condition for the laser is obtained. Alternately, the control voltage may be fed back to the laser excitation power supply to control the laser beam energy.

Because the monitor of the invention can be placed adjacent to the laser, or even integral with the laser, and in alignment with the laser, radiation hazards to operating personnel is minimized. Energy absorption and spreading is considerably less than in the case of systems of the prior art using beam splitting devices. Furthermore, since the device is constructed of material capable of withstanding high energy levels without destruction and since the laser beam does not impinge upon the electrodes in the gas-filled chamber of the monitor, detection of high energy laser beams, such as those now available with carbon dioxide gas lasers, has finally become realizable.

Likewise, gain control circuits for optical lasers wherein a control voltage derived from the aforesaid monitor device of the invention is fed back to a laser gain-determining means are now feasible for use with lasers, particularly for those operating at high energy levels and relatively high frequency.

Although the laser monitor and gain control circuit of the invention is particularly adaptable for high energy applications, it is by no means limited thereto. For example, the laser monitor can be used at relatively low energy levels. Unlike prior art detectors, which because of noise limitations at ambient temperatures, require liquid helium or liquid nitrogen cooling, the laser monitor of the invention can be operated at room temperatures or in the field without resort to bulky, heavy and costly cooling equipment. Moreover, the laser monitor of the invention, unlike prior art monitors, does not distort or attenuate the laser beam and, if the monitor contains a gas substantially identical to that of the laser, appreciable gain may even be achieved.

BRIEF DESCRIPTION OF THE DRAWINGS

The FIGURE is a schematic representation of a laser monitor and gain control system according to the invention.

DESCRIPTION OF THE PREFERRED EMBODIMENTS

Referring to the drawing a laser 5 is shown located adjacent to and in line with a monitor 20. The laser 5 is shown, by way of example, as a gas laser having a chamber 7 filled with a gas which may comprise carbon dioxide. The necessary laser excitation is provided by means of electrodes 8 and 9 connected to an excitation power supply 11 which, for a tube 2 meters long may be of the order of 5 kilovolts. In the embodiment shown in FIG. 1, the laser includes a stationary mirror 13 and a movable mirror 14 which together define a cavity resonator. The movable mirror 14 is mounted on a piezoelectric or electrostrictive transducer element 15. A coherent laser beam 16 is generated within the laser 10 and passes through an optically transparent window 17 which can be made, for example, of potassium chloride or sodium chloride. Such materials are transparent to laser radiation in the region of 10 microns and are capable of passing large amounts of energy at this frequency without deteriorating or destruction.

The laser beam 16 is directed onto the monitor 20 which consists of a chamber 25 defined by a glass cylinder 22 closed at the ends by a pair of windows 23 and 24; these windows, like those of the laser 5, can be made of such materials as potassium chloride or sodium chloride. The chamber 25 of monitor 20 is filled with a gas which, preferably, is substantially identical to that used in the laser 5, since the resonance absorption frequency for the monitor gas will correspond to the frequency of operation of the laser. In one embodiment, the gas used in the laser and the gas used in the monitor for a carbon dioxide laser consisted of three parts of carbon dioxide to 10 parts of nitrogen and 10 parts of helium, all by weight. The gas pressure was about 1 Torr.

A pair of electrodes 27 and 28, made of a refractory metal such as tungsten, are sealed into diametrically opposed portions of the cylinder 22, as by conventional glass bead seals 29 and an adjustable direct current voltage is supplied to the electrodes 27 and 28 from a battery or other reference source 30, which can be of the order of 475 volts. The actual value of this voltage will depend upon such factors as electrode spacing, gas pressure and electrode shape. In series with the power source 30 is an indicating meter 32, such as a microammeter, and a current-limiting resistor 35 which, for example can be of the order of 20 kilohms. The electrodes 27 and 28 are so positioned in the monitor 20 that they do not lie in the path of the laser beam and preferably so that the laser beam will pass close to the cathode electrode 27. One embodiment of the monitor 20 is about 3 inches long and 5 inches in diameter and can be mounted very close to, or in contact with, the laser 5.

The voltage applied between the cathode electrode 27 and anode 28 is adjusted until a glow discharge occurs. The discharge current flowing through the series circuit including the resistor 35 and meter 32 can be noted on the current meter 32. For the electrode arrangement shown in the monitor 20 of FIG. 1, when the laser beam passes adjacent the cathode 27, a distinct decrease in current is noted on the meter 22 when the laser beam passes in the vicinity of the cathode electrode 27; the amount of current change is proportional to the laser energy. A smaller decrease is noted when the laser beam passes midway between the two electrodes 27 and 28. When the laser beam is made to pass close to the anode electrode 28, however, an increase in current is noted on the meter 32 when the laser energy increases; this increase in current is considerably less than the decrease in current when the laser beam is directed close to the cathode electrode 27. In one example, using a 20 kilohm resistor 35, a 10.6 micron, 1 watt laser beam passing through the monitor 20 produced an output voltage of 10 millivots across resistor 35, corresponding to a current of about 0.5 microampere. The cathode glow region is the prime mechanism by which electrons are released from the cathode 27. It is believed that the cathode glow region (a region of high field which attracts electrons from the cathode) is broken up by passage of the electron beam through the gas 25 in monitor 20, thereby decreasing the current flowing in the monitor gas 25. The amount by which the current decreases is a function of the energy content of the laser beam 16 as it passes completely through the monitor 20. The meter 32 may be calibrated to read laser energy directly in watts. Alternatively, a calibrated cathode ray oscilloscope may be used in lieu of the meter 32, provided the voltage across resistor 35 is applied to the intensity control electrode of the oscilloscope.

It is possible to position the electrode 27 and 28 inside the laser 5, in which case the separate monitor enclosure 22–24 can be dispensed with. The external circuitry associated with the electrodes 27 and 28 enclosed within the laser 5 would be just as shown in FIG. 1. The monitor electrodes 27 and 28 would be mounted independently of the laser excitation electrodes 8 and 9, in such a case. The monitor electrodes can be mounted axially of said laser beam, rather than transverse to the laser beam; for example, ring shaped electrodes may be mounted adjacent opposite ends of the laser 5.

The speed of response of the monitor 20 will depend upon the gas used. For example, the use of hydrogen with its ions of low mass would tend to increase response speed. For high sensitivity, a material which has a radiation energy level corresponding to the frequency of the laser beam appears preferable. Carbon dioxide has been tried successfully as a monitor gas 25, but a mixture of three parts carbon dioxide to 10 parts nitrogen and helium has been found to provide even greater response.

The invention also contemplates an automatic gain control system for optimizing the laser energy output. This can be achieved by applying the voltage appearing across resistor 35 as a control voltage through feedback loop 40 to the transducer 45 associated with the movable laser mirror 14. The transducer 45 may be a piezoelectric transducer with the laser mirror 14 mounted on one face thereof. The control voltage across resistor 35 varies in accordance with the laser energy passing through the monitor 20. After amplification in the feedback loop 40, this voltage is applied across transducer 45 and the resultant mechanical movement of the transducer adjusts the position of the attached movable laser mirror 14 to maintain optimum tuning and energy output.

In an alternative type of gain control setup, the output of the feedback loop 40 can be applied to control the excitation power supply 11 of the laser. As the output voltage across resistor 35 changes, the excitation voltage to the electrodes 8 and 9 of laser 5 would change correspondingly, and output energy level changes of the laser could be compensated for.

What is claimed is:

1. In combination, a high power laser comprising a lasing medium and means for exciting said lasing medium, said laser including a cavity resonator defining a path along which a laser beam is propagated, said laser beam being coupled out of said cavity resonator; and a laser energy monitor positioned to receive the laser beam coupled out of said cavity resonator, said monitor comprising a gas cell disposed externally of said laser said gas cell being traversed by said laser beam and consisting along the beam path only of material optically transparent to said laser beam, means for establishing a glow discharge within said gas cell, said means for establishing including spaced, pointed, electrodes mounted transverse to said laser beam, inserted within said cell and disposed entirely outside the path of said laser beam, and current indicating means in circuit with said means for establishing for indicating the laser beam energy as a function of the current flowing through said gas cell.

2. A combination according to claim 1 wherein the contents of said gas cell comprises three parts carbon dioxide to 10 parts nitrogen and 10 parts helium all by weight.

3. The combination according to claim 1 wherein said means for establishing includes a direct current power supply.

4. The combination according to claim 6 wherein said means for establishing includes a direct current power supply.

5. The combination accordance with claim 1 wherein said lasing medium comprises the gases carbon dioxide, helium and nitrogen and wherein said gas cell contains the gases carbon dioxide, helium and nitrogen.

6. The combination according to claim 1 wherein said gas cell comprises a mixture of three parts carbon dioxide to ten parts nitrogen and ten parts helium all by weight.

* * * * *